United States Patent
Hu (10) Patent No.: US 7,409,527 B2
(45) Date of Patent: Aug. 5, 2008

(54) BIDIRECTIONAL DATA STORING METHOD

(75) Inventor: Chih-Lin Hu, Tai-Nan (TW)

(73) Assignee: Qisda Corporation, Shan-Ting Tsun, Gueishan Hsiang, Taoyuan County (TW)

( * ) Notice: Subject to any disclaimer, the term of this patent is extended or adjusted under 35 U.S.C. 154(b) by 248 days.

(21) Appl. No.: 11/163,822

(22) Filed: Nov. 1, 2005

(65) Prior Publication Data

US 2006/0095707 A1    May 4, 2006

(30) Foreign Application Priority Data

Nov. 1, 2004    (TW) .............................. 93133262 A (51) Int. Cl.
G06F 9/32    (2006.01)
(52) U.S. Cl. .................... 711/219; 711/217; 711/218
(58) Field of Classification Search ........................ None
See application file for complete search history.

(56) References Cited

U.S. PATENT DOCUMENTS 5,712,740 A * 1/1998 Kikuchi et al. ................ 360/48
6,594,052 B2 * 7/2003 Hiramatsu et al. ........... 398/140
2004/0103241 A1 * 5/2004 Chang et al. ................. 711/103
2004/0236897 A1 * 11/2004 Cheng ......................... 711/103
2004/0268063 A1 * 12/2004 Lasser ......................... 711/154

FOREIGN PATENT DOCUMENTS

JP          9-134312        5/1997

* cited by examiner

Primary Examiner—Than Nguyen
(74) Attorney, Agent, or Firm—Winston Hsu (57) ABSTRACT

A data storing method for a storage apparatus. The storage apparatus has a memory block, which includes a first terminal and a second terminal. The data storing method includes receiving a data set; selecting a first writing direction or a second writing direction to be a preferred writing direction, wherein when the first writing direction is selected to be the preferred writing direction, the first terminal is a starting point corresponding to the first writing direction, and when the second writing direction is selected to be the preferred writing direction, the second terminal is a starting point corresponding to the second writing direction; and writing the data set into the memory block according to the selected writing direction.

14 Claims, 7 Drawing Sheets

| Data set | Starting address | Size |
|---|---|---|
| Da1 | k | 30 |
| Da2 | k+149 | 45 |
| Da3 | k+30 | 20 |

BIDIRECTIONAL DATA STORING METHOD

BACKGROUND OF THE INVENTION

1. Field of the Invention

The present invention relates to a data storing method, and more specifically, to a bi-directional data storing method for storing data sets selectively from one of two terminals of a memory block.

2. Description of the Prior Art

In general, for storing data sets, there are three primary methods: ordered, unordered, and hashed data-storing methods. The characteristic of the ordered data-storing method is to physically order the data sets stored in a memory. That is, when writing a data set into the memory, the system needs to perform a sorting operation to physically order the data sets stored in the memory. The characteristic of the unordered data-storing method is to write the data sets into the memory according to the time sequence of receiving the data sets. Hence, compared with the ordered data-storing method, when storing a data set, the unordered data-storing method omits a corresponding sorting operation. Because the data sets stored in the memory are not arranged in order conforming to any kind of rule, the system needs to further provide a mapping table to record a starting address and a size of each data set. Therefore, when accessing a specific data set, the system reads the address of the specific data set recorded in the mapping table without sequentially searching the memory for the specific data set. The hashed data-storing method performs a computation operation on each data set by using a hash function, wherein a value generated by the computation operation corresponds to a predetermined memory address. Hence, when accessing the data set, the system only needs to perform a computation operation using the hash function and then the memory address corresponding to the data set can be generated.

These three data-storing methods will be limited when they are applied in a system with a small memory, such as a memory in a mobile phone. Usually, a mobile phone's memory capacity is small. A possible consequence of this is that when utilizing the above-mentioned hashed data-storing method, if the system cannot select an appropriate hash function, a situation in which the memory is wasted may occur. Compared with the hashed data-storing method, the ordered data-storing method can efficiently utilize all of the memory. The disadvantage is that it is necessary to perform the above-mentioned sorting operation when storing each data set, which is a heavy load for the mobile phone, because the mobile phone has less computational abilities. It could therefore be concluded that for the mobile phone, the unordered data-storing method would seem to be an appropriate compromise. The unordered data-storing method writes the data sets into the memory according to the time sequence of receiving the data sets. A disadvantage of this method, however, is that memory spaces allocated and released by any kind of the three above-mentioned data-storing methods will discontinuously exist in the memory and cannot be utilized again. Hence, after a certain period of time, it is necessary to perform a defragmentation operation on the memory in order to combine the above-mentioned discontinuous memory spaces with remaining spaces of the memory, to allow the combined available memory spaces to be allocated for storing other data sets.

Figure 1:
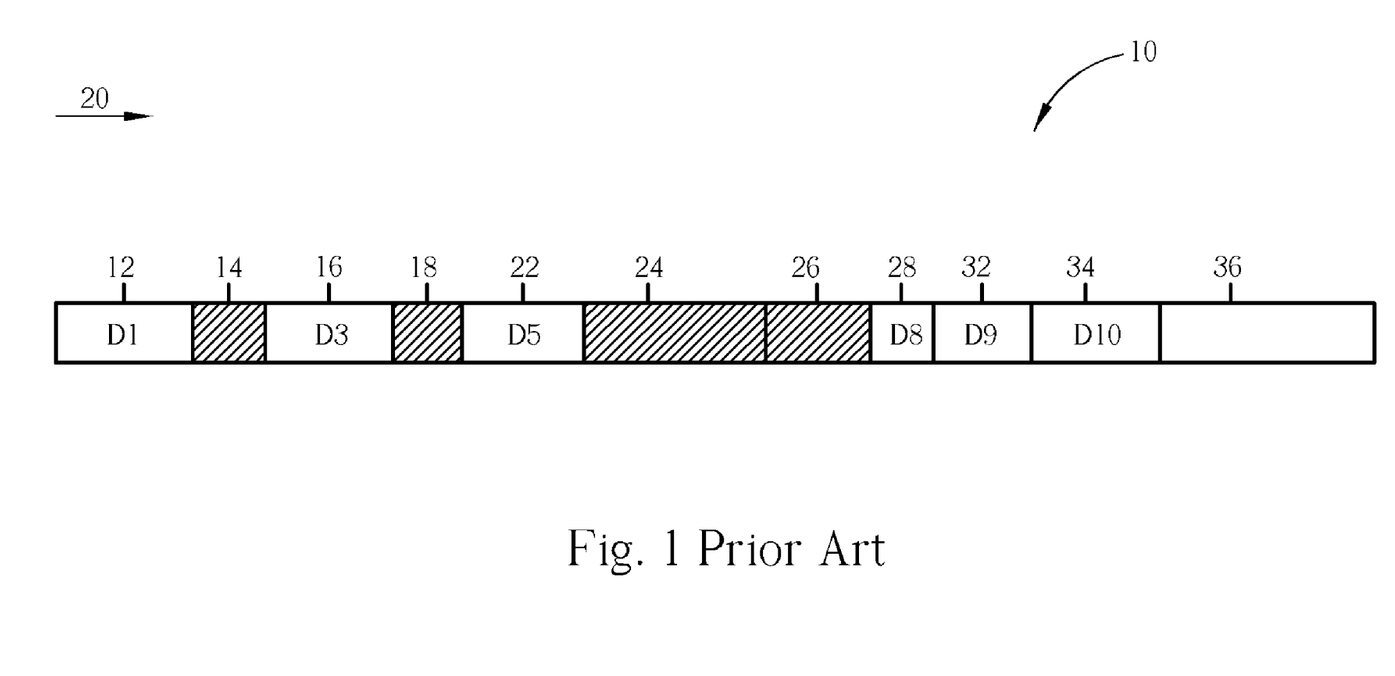
FIG. 1 is a diagram of a memory block when utilizing a conventional unordered data-storing method.

Please refer to FIG. 1. FIG. 1 is a diagram of a memory block 10 when utilizing a conventional unordered data-storing method. As shown in FIG. 1, the memory block 10 comprises a plurality of memory spaces 12, 16, 22, 28, 32, and 34 storing data sets $D_1$, $D_3$, $D_5$, $D_8$, $D_9$, and $D_{10}$ respectively, and a plurality of released memory spaces (parts with oblique lines shown in FIG. 1) 14, 18, 24, and 26, and a never-used memory space 36. When the first data set $D_1$ is received, the memory space 12 of the memory block 10 is arranged to store the data set $D_1$ according to the direction indicated by a pointer 20, and then the memory space 14 of the memory block 10 is arranged to store the data set $D_2$. In the same manner, the data sets $D_3$~$D_{10}$ are sequentially and continuously written into the memory block 10. Finally, the memory space 34 is arranged to store the tenth data set $D_{10}$. After this operation, some data sets (i.e. the data sets $D_2$, $D_4$, $D_6$, $D_7$) may not be utilized by the system, so the system releases the memory spaces 14, 18, 24, 26 (parts with oblique lines shown in FIG. 1) storing the data sets $D_2$, $D_4$, $D_6$, $D_7$. The memory space 36 and the memory spaces 14, 18, 24, 26 can now be arranged to store other data sets, so the system performs a defragmentation operation on the memory block 10 to make the memory spaces 14, 18, 24, 26 be concentrated in the left side of the memory block 10, which means the memory spaces 14, 18, 24, 26 are combined with the memory available space 36. This allows the memory spaces to be more efficiently arranged to store other data sets. The above-mentioned defragmentation operation needs to be performed repeatedly, and each performance takes a significant amount of time, which not only rapidly increases the complexity of tasks executed by the system, but also makes a user feel that the reactions of the system are slow. Therefore, to efficiently utilize memory spaces and reduce the complexity of performing a defragmentation operation on the memory is a major topic of the claimed invention.

SUMMARY OF THE INVENTION

One of the objectives of the claimed invention is therefore to provide a bi-directional data storing method to solve the above-mentioned problem, thereby preventing an excessively long time being spent on defragmentation operations.

According to the claimed invention, a data managing method for storing all management data in a management bank of a non-volatile memory is disclosed. A bi-directional data storing method for storing data in a storage apparatus is disclosed. The storage apparatus comprises a plurality of memory blocks. The bi-directional data storing method comprises: receiving a data set; selecting a first writing direction or a second writing direction to be a preferred writing direction of a target memory block; and writing the data set into the target memory block according to the selected writing direction.

In addition, the claimed invention provides an electronic device. The electronic device comprises: a memory block comprising a first terminal and a second terminal; and a program, wherein when executing the program, a data set is generated and the program selectively writes the data set into the memory block from the first terminal or the second terminal.

The data storing method according to the claimed invention writes a data set into a memory block selectively from the first terminal or the second terminal, which means the size of the data sets that need to undergo a defragmentation operation are reduced to one half of their size (at the most), and therefore the time spent by the memory defragmentation operation can be substantially reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
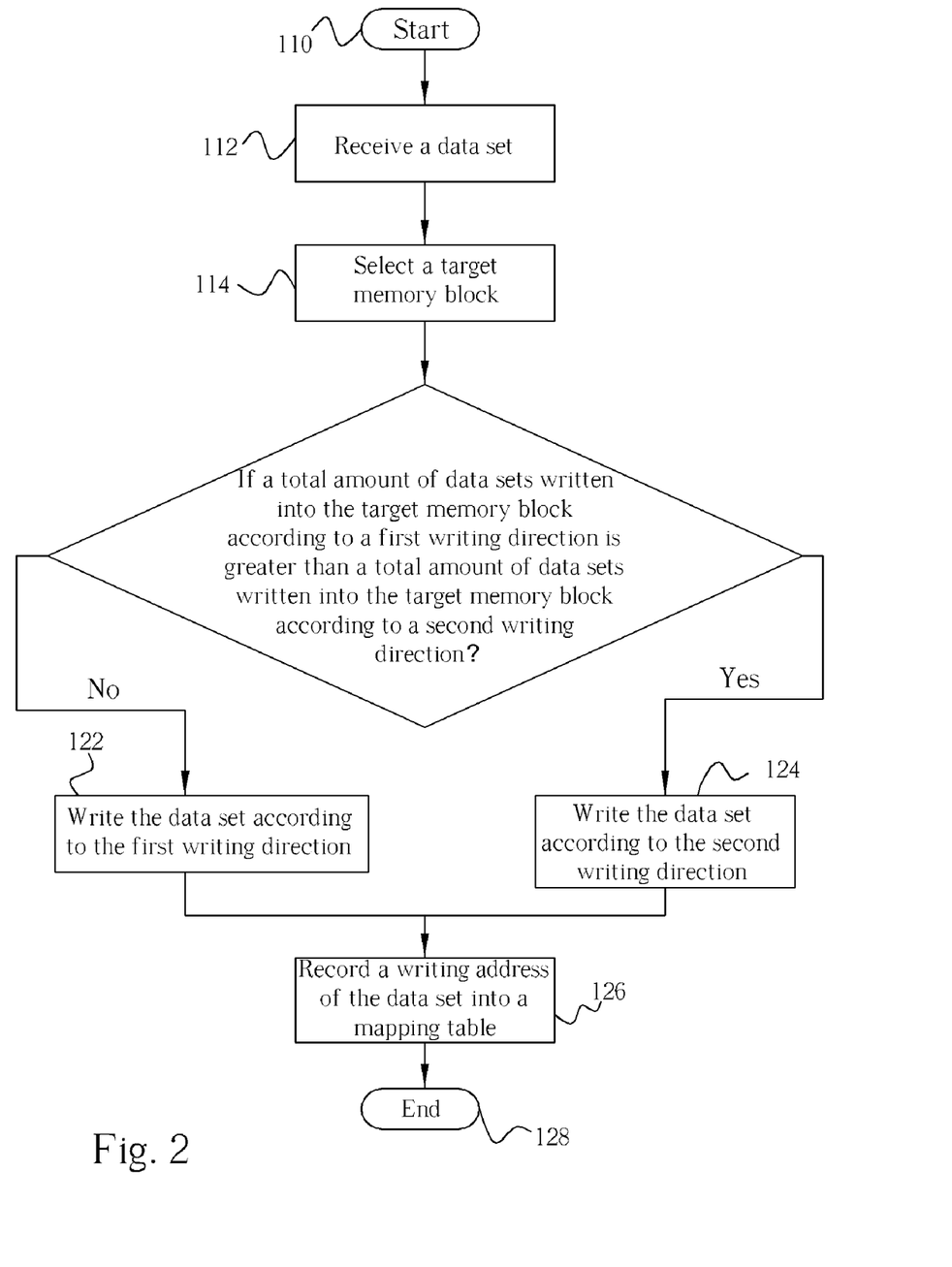
FIG. 2 is a flowchart of an embodiment of the bi-directional data storing method according to the present invention.

Please refer to FIG. 2. FIG. 2 is a flowchart of an embodiment of the bi-directional data storing method according to the present invention. The bi-directional data storing method according to the present invention can be applied in a system with limited memory resources, such as a mobile unit. As shown in FIG. 2, in the present embodiment, the bi-directional data storing method contains the following steps:

Step 110: Start.

Step 112: Receive a data set.

Step 114: Select a target memory block from a plurality of memory blocks in order to write the data set into the target memory block.

Step 116: Determine if the total amount of the data sets written into the target memory block according to the first writing direction is greater than the total amount of the data sets written into the target memory block according to the second writing direction; if not, proceed to step 122; otherwise, proceed to step 124.

Step 122: Write the data set according to the first writing direction. Proceed to step 126.

Step 124: Write the data set according to the second writing direction. Proceed to step 126.

Step 126: Record a writing address of the data set into a mapping table and record the total amount of the data set written according to the writing direction.

Step 128: End.

In the present embodiment, two pointers, a first pointer and a second pointer, are adopted in a way for determining whether the total amount of the data sets written into the target memory block according to the first writing direction is greater than the total amount of the data sets written into the target memory block according to the second writing direction. A first pointer is utilized for indicating the total amount of the data sets written according to the first writing direction, and the second pointer is utilized for indicating the total amount of the data sets written according to the second writing direction. A detailed description of the above-mentioned method will be described later.

Figure 3:
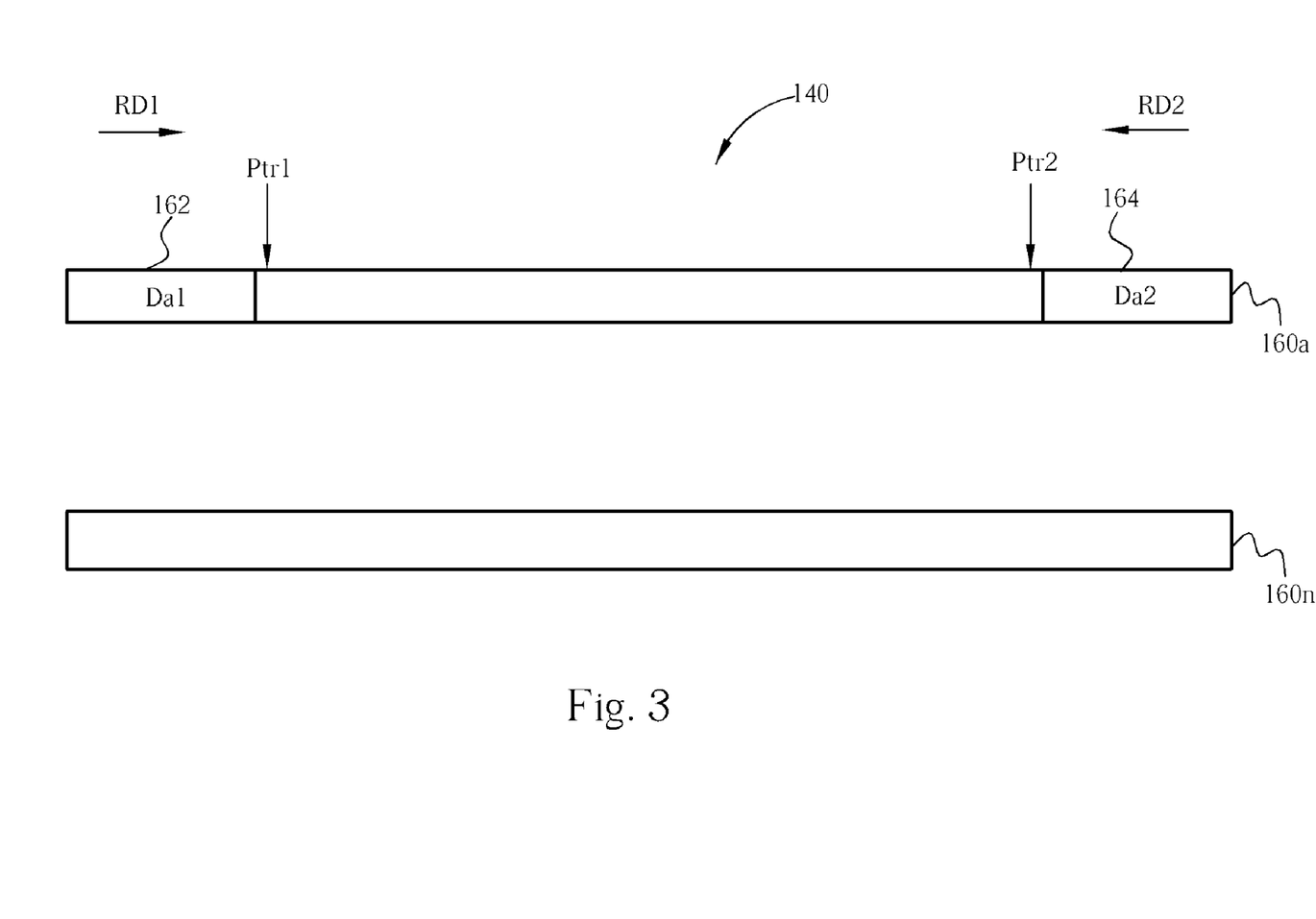
FIG. 3 is a diagram of the bi-directional data storing method applied in a storage apparatus according to the present invention.

Please refer to FIG. 3. FIG. 3 is a diagram of the bi-directional data storing method applied in a storage apparatus 140 according to the present invention. In the present embodiment, the storage apparatus 140 comprises a plurality of memory blocks 160a~160n, each of them having a capacity of 150 bits. Hence, if the starting address of the memory block 160a is k, then the end address is k+149. As shown in FIG. 3, a memory space 162 is utilized for storing a data set $D_{a1}$ whose size is 30 bits. A memory space 164 is utilized for storing a data set $D_{a2}$ whose size is 45 bits. The data set $D_{a1}$ and the data set $D_{a2}$ are written into the memory block 160a according to a writing direction RD1 and a writing direction RD2 respectively. In addition, for the memory block 160a, a pointer Ptr1 is utilized for indicating a total amount of data sets written according to the writing direction RD1, and a pointer Ptr2 is utilized for indicating a total amount of data sets written according to the writing direction RD2. Therefore, after the data sets $D_{a1}$, $D_{a2}$ are written into the memory block 160a, the address indicated by the pointer Ptr1 is k+30, and the address indicated by the pointer Ptr2 is k+149−45.

Figure 4:
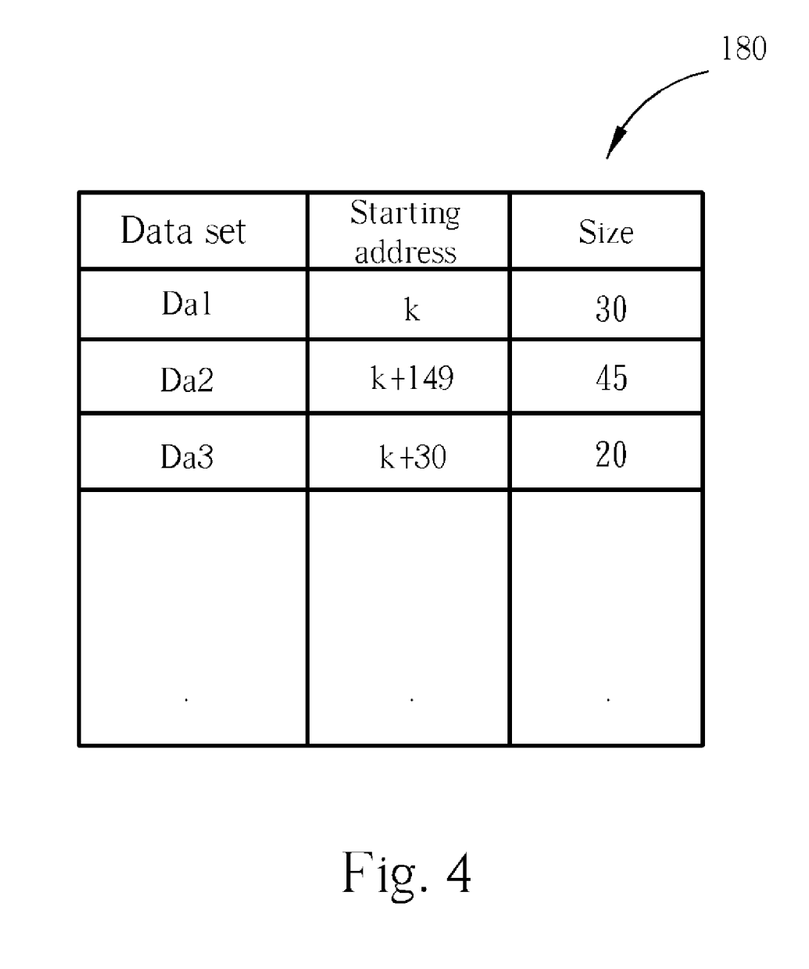
FIG. 4 is a mapping table utilized in the bi-directional data storing method according to the present invention.

Please refer to FIG. 2 and FIG. 3. When the system receives a data set $D_{a3}$ whose size is 20 bits, the system firstly chooses a target memory block. In the present embodiment, the memory block 160a is assumed to be the selected target memory block. The detailed description of the mechanism of selecting the target memory block will be described later. Next, the system determines if the total amount of the data sets written into the target memory block according to the writing direction RD1 is greater than the total amount of data sets written into the target memory block according to the writing direction RD2 by using the pointer Ptr1 and the pointer Ptr2. In the present embodiment, after computing the total amount of data sets by subtracting the starting address corresponding to the writing direction from the address indicated by the pointer, the total amount of data sets written according to the writing direction RD1 is determined to be less than the total amount of data sets written according to the writing direction RD2. Therefore, the system writes the data set $D_{a3}$ into the memory block 160a according to the writing direction RD1. Finally, after the data set $D_{a3}$ is attached behind the data set $D_{a1}$, the pointer Ptr1 corresponding to the writing direction RD1 indicates the address k+50, and the starting address of the data set $D_{a3}$ is recorded into a mapping table. Please refer to FIG. 4. FIG. 4 is a mapping table 180 utilized in the bi-directional data storing method according to the present invention. As shown in FIG. 4, after the data sets $D_{a1}$, $D_{a2}$, $D_{a3}$ are sequentially written into the memory block 160a, the mapping table 180 records the starting address and the size of each data set $D_{a1}$, $D_{a2}$, $D_{a3}$. If the data set $D_{a2}$ is not utilized again, the system needs to release the memory space 164 storing the data set $D_{a2}$, then all the information about the data set $D_{a2}$ will automatically be deleted from the mapping table 180.

Figure 5:
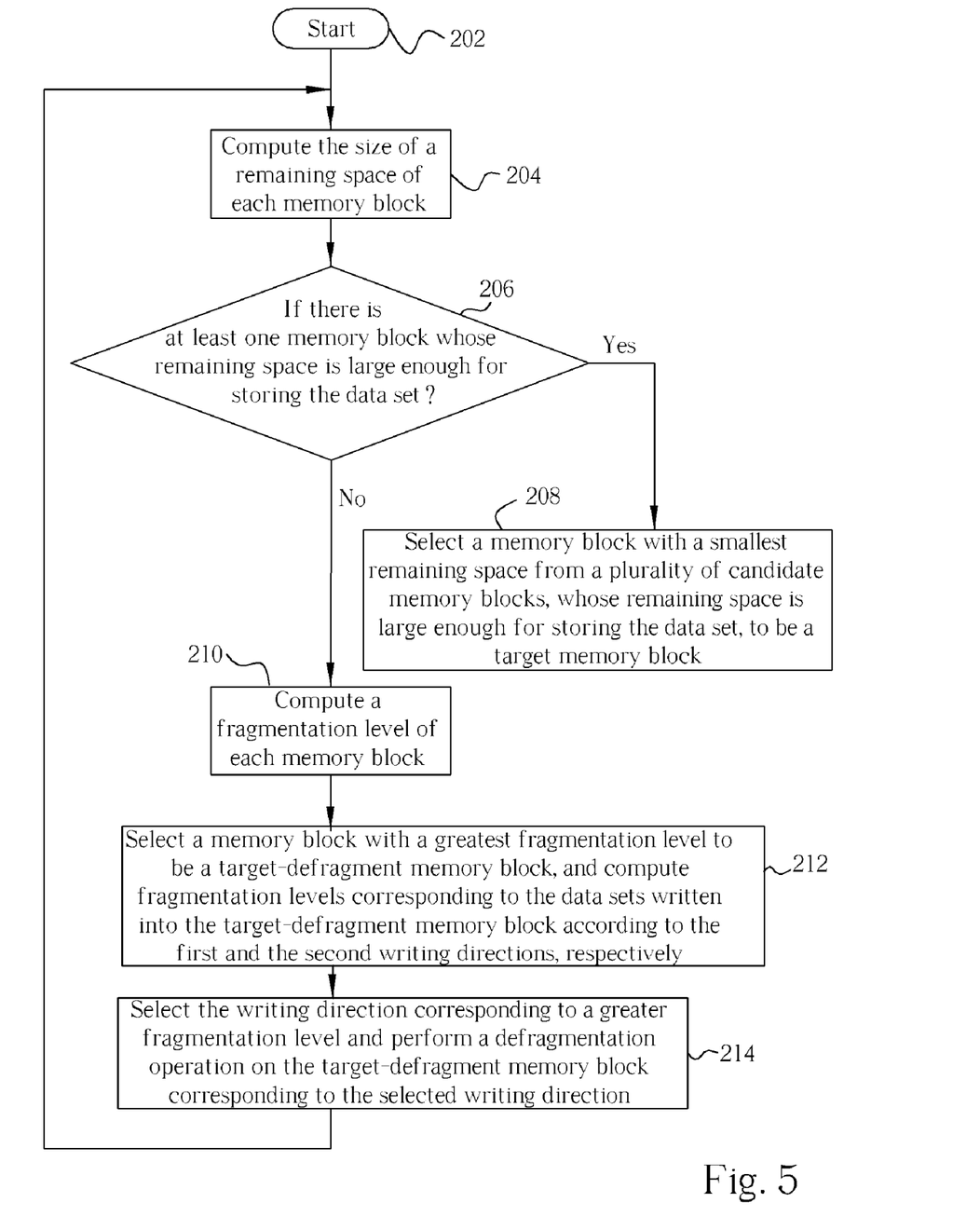
FIG. 5 is a detailed flowchart of the step 114 shown in FIG. 2.

Please refer to FIG. 5. FIG. 5 is a detailed flowchart of the step 114 shown in FIG. 2. As shown in FIG. 5, the operation of selecting the target memory block (i.e. step 114) comprises the following steps:

Step 202: Start.

Step 204: Compute the size of a remaining space of each memory block.

Step 206: Determine if there is at least one memory block whose remaining space is large enough for storing the data set; if so, proceed to step 208; otherwise, proceed to step 210.

Step 208: Select a memory block with a smallest remaining space from the memory blocks, whose remaining space is large enough for storing the data set, to be a target memory block.

Step 210: Compute a fragmentation level of each memory block.

Step 212: Select a memory block with a greatest fragmentation level to be a target-defragment memory block, and compute fragmentation levels corresponding to the data sets written into the target-defragment memory block according to the first and the second writing directions respectively.

Step 214: Select the writing direction corresponding to a greater fragmentation level and perform a defragmentation operation on the target-defragment memory block corresponding to the selected writing direction, then proceed back to step 204.

In the present embodiment, the fragmentation levels are computed by determining if there are several discontinuous memory spaces in a memory block according to the starting address and the size of each of the data sets recorded in a mapping table (i.e. the mapping table 180 shown in FIG. 4). That is, if the amount of discontinuous remaining spaces is greater, the fragmentation level of the memory block is also greater. The detailed description of selecting a target-defragment memory block is described in a following example.

Figure 6:
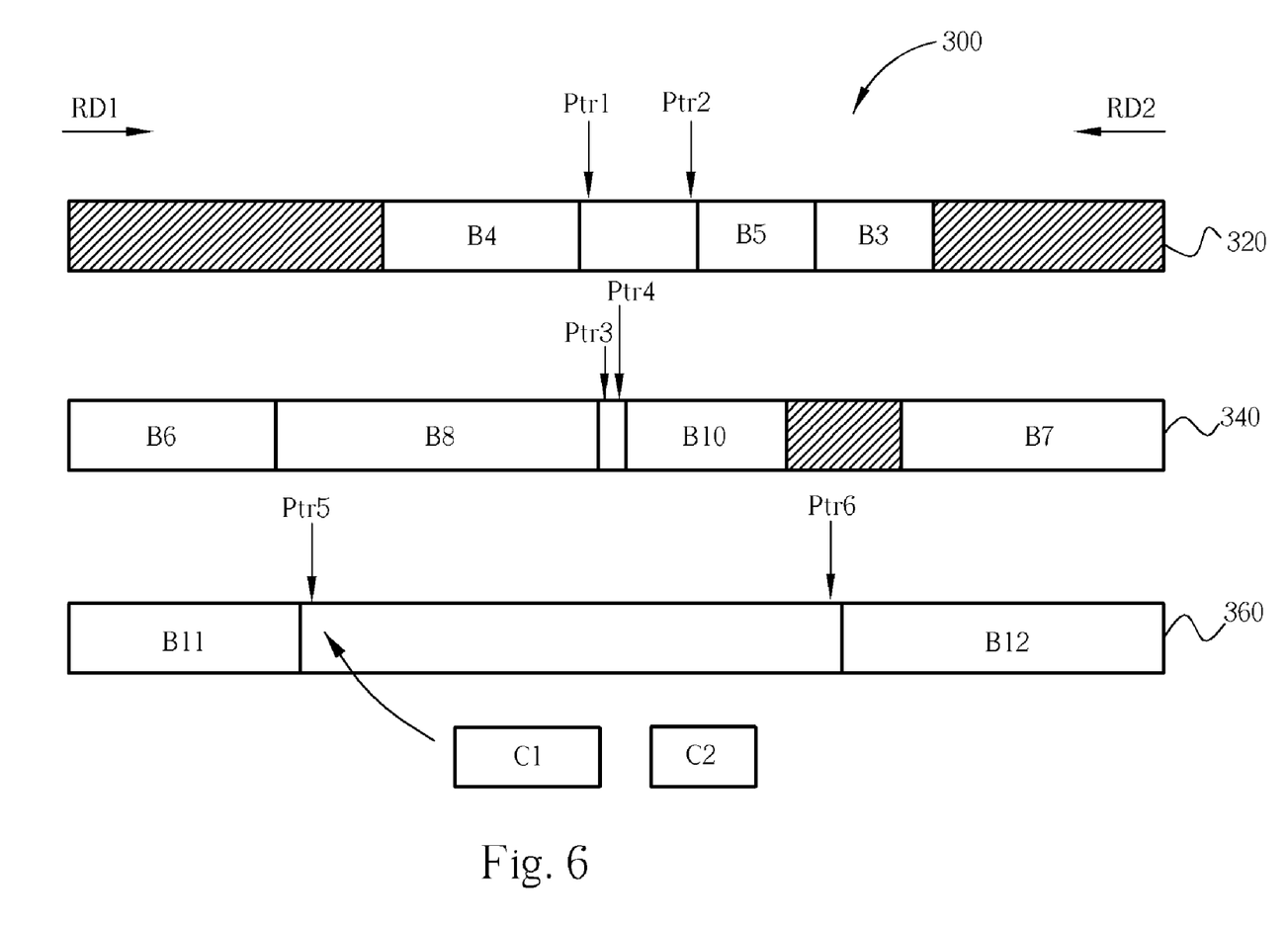
FIG. 6 is a diagram of the bi-directional data storing method applied in another storage apparatus according to the present invention.

Please refer to FIG. 6. FIG. 6 is a diagram of the bi-directional data storing method applied in another storage apparatus 300 according to the present invention. As shown in FIG. 6, in the present embodiment, the storage apparatus 300 comprises three memory blocks 320, 340, 360, and each of them has a capacity of 150 bits. Hence, if the addresses occupied by the memory block 320 are from m to m+149, then the addresses of the memory block 340 will be from m+150 to m+299, and the addresses of the memory block 360 will be from m+300 to m+449. Additionally, assume that for the memory block 320, a pointer Ptr1 corresponding to the writing direction RD1 indicates the address m+60, and a pointer Ptr2 corresponding to the writing direction RD2 indicates the address m+79. For the memory block 340, a pointer Ptr3 corresponding to the writing direction RD1 indicates the address m+225, and a pointer Ptr4 corresponding to the writing direction RD2 indicates the address m+229. As for the memory block 360, a pointer Ptr5 corresponding to the writing direction RD1 indicates the address m+330, and a pointer Ptr6 corresponding to the writing direction RD2 indicates the address m+419. In addition, the parts with oblique lines shown in FIG. 6 represent memory spaces that have previously been allocated and then have been released. The data sets stored in the memory spaces will not be utilized again. However, these memory spaces are distributed in the memory block, so the remaining space of the memory block may not be large enough for it to be allocated for storing a new data set. As shown in FIG. 6, the memory block 320 presently stores data sets $B_3$, $B_4$, $B_5$, the memory block 340 presently stores data sets $B_6$, $B_7$, $B_8$, $B_{10}$, and the memory block 360 presently stores data sets $B_{11}$, $B_{12}$. Moreover, the capacity between the addresses indicated by the pointers Ptr1, Ptr2 is the remaining space of the memory block 320, the capacity between the addresses indicated by the pointers Ptr3, Ptr4 is the remaining space of the memory block 340, and the capacity between the addresses indicated by the pointers Ptr5, Ptr6 is the remaining space of the memory block 360.

Please refer to FIG. 5 and FIG. 6. When the system receives a data set $C_1$ whose size is 60 bits, the system firstly computes remaining spaces of the memory blocks 320, 340, and 360. In the present embodiment, for each of the memory blocks 320, 340, and 360, from the difference between the two addresses of the memory block indicated by the two pointers, the size of the remaining space of the memory block 320 is 20 bits. In the same manner, the size of the remaining space of the memory block 340 is 5 bits, and the size of the remaining space of the memory block 360 is 90 bits. In other words, only the memory block 360 has remaining space large enough for storing the data set $C_1$. Therefore, the memory block 360 is the target memory block for storing the data set $C_1$. It should be noted that when the system detects that there is more than one memory block whose remaining space is large enough for storing the data set $C_1$, a memory block with a smallest remaining space will be selected to store the data set $C_1$, for efficiently utilizing the memory space.

Figure 7:
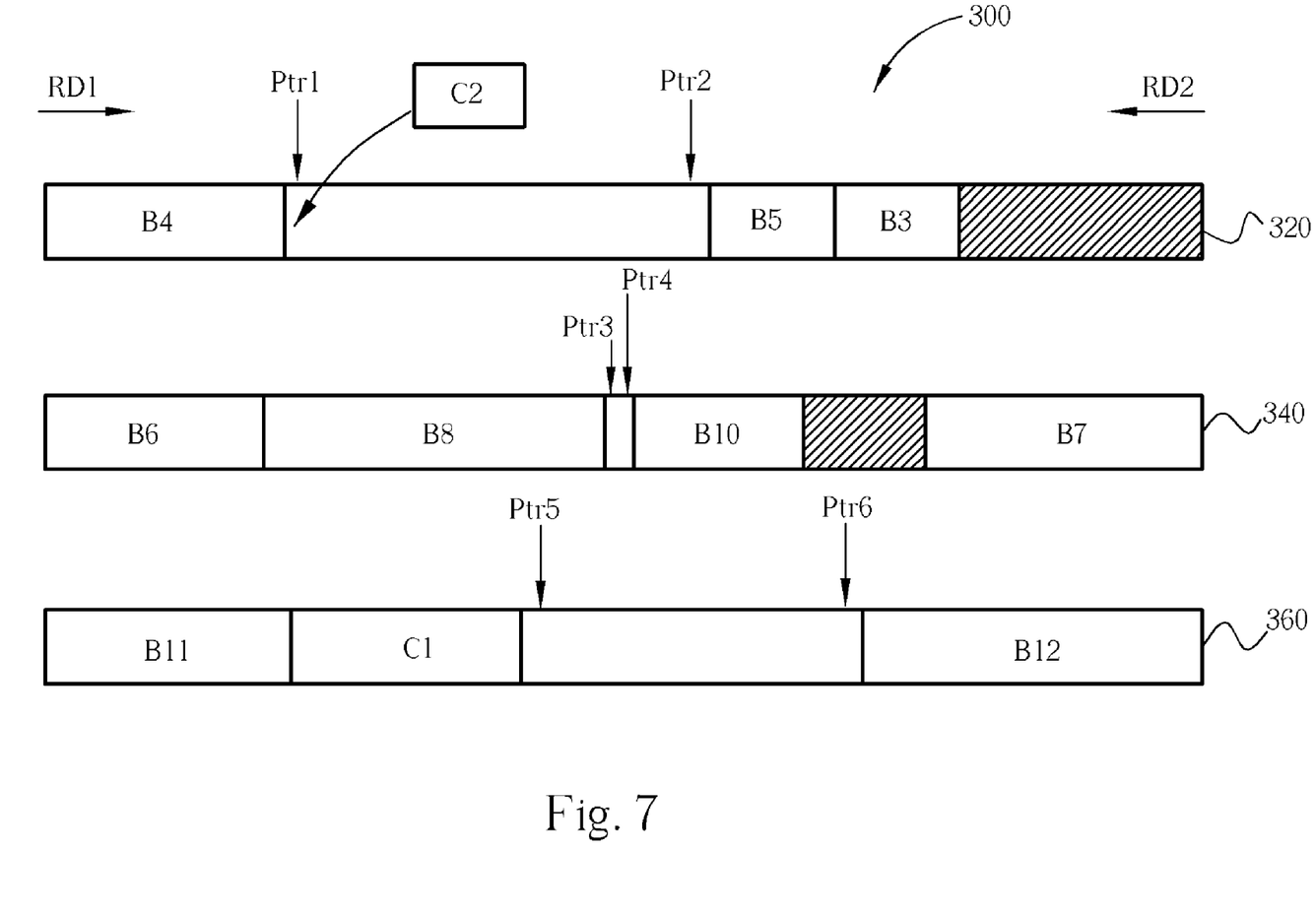
FIG. 7 is a diagram of a defragmentation operation performed on the storage apparatus shown in FIG. 6 according to the bi-directional data storing method provided by the present invention.

When the system further receives a data set $C_2$ whose size is 40 bits, and the sizes of the remaining spaces of the memory blocks 320, 340, and 360 are 20 bits, 5 bits, and 30 bits respectively, it can be seen that none of them is large enough for storing the data set $C_2$. Hence, the system will further compute the fragmentation levels of the memory blocks 320, 340, and 360. A conventional method for computing a fragmentation level is utilized in the present embodiment. That is, the address and the size of each of the data sets recorded in the mapping table utilized by the storage apparatus 300 are queried, the released memory spaces (parts with oblique lines shown in FIG. 6) of the memory blocks 320, 340, and 360 are calculated, and then a memory block with a largest released memory space (that is, a memory block with a greatest fragmentation level) is selected to be the target-defragment memory block. Hence, in the present embodiment, the memory block 320 is selected to be the target-defragment memory block. Finally, the system computes the fragmentation levels of the target-defragment memory block 320 according to the writing directions RD1 and RD2, selects a writing direction corresponding to a greater fragmentation level and then performs a defragmentation operation on the target-defragment memory block corresponding to the selected writing direction. Because the writing direction RD1 corresponds to the greater fragmentation level, a defragmentation operation will be performed on the data sets written into the memory block 320 according to the writing direction RD1. As shown in FIG. 6, the data set $B_4$ will firstly be moved in a left direction to make the starting address of the data set $B_4$ be m. If the size of the data set $B_4$ is 36 bits, the pointer Ptr1 of the writing direction RD1 changes to indicate m+36. Please refer to FIG. 7. FIG. 7 is a diagram of performing a defragmentation operation on the storage apparatus 300 according to the bi-directional data storing method provided by the present invention. After a defragmentation operation is performed on the memory block 320, the released memory space in front of the memory space storing the data set $B_4$ and the remaining space behind the memory space storing the data set $B_4$ are combined. Therefore, after the defragmentation operation is performed on the memory block 320, the data set $C_2$ can be successfully written into the memory block 320. Please note that the defragmentation methods utilized by the present invention are not limited to the present embodiment. No matter whether a defragmentation operation is performed on a target-defragment memory block according to a specific writing direction, or defragmentation operations are simultaneously performed on a target-defragment memory block according to two writing directions, the two above-mentioned ways are both covered by the present invention. Furthermore, it is also covered by the present invention to convince the left or right side of each memory block an sub-memory-block, wherein the right side of the memory block is between the end address and the pointer of the writing direction RD2 and the left side of the memory block is between the beginning address and the pointer of the writing direction RD1 when selecting a target-defragment memory block. Therefore the target-defragment memory block can be selected form the polarity of sub-memory-blocks.

Compared to the related art, the bi-directional data storing method according to the present invention arranges a plurality of data sets to be averagely spread in two terminals of a memory block according to a selected writing direction. Assume that the data amount of the data sets is m bits. Then the data amount of the data sets written from each of the two terminals is about m/2 bits. When performing a defragmentation operation, each of the conventional data storing methods will need to perform a defragmentation operation on the whole memory block. Therefore, the complexity of the defragmentation operation is about $m^x$. However, the complexity of the bi-directional data storing method according to the present invention performing a defragmentation operation on the whole memory block is $$2 \cdot \left(\frac{m}{2}\right)^x,$$

which is obviously less than $m^x$ the complexity of the conventional method. In addition, the bi-directional data storing method averagely spreads the data sets of m bits over the two terminals of the memory block. Hence, when the time for performing a defragmentation operation is limited and it is necessary to select one half of all data sets and perform a defragmentation operation on that half of all data sets, then the complexity of the defragmentation operation of that half of all data sets is about $$\left(\frac{m}{2}\right)^x.$$

Therefore, the bi-directional data storing method can not only reduce the complexity of performing a defragmentation operation on a memory block, but can also use only a half of the time originally needed to perform a defragmentation operation on the memory block. When time is limited, a defragmentation operation on a half of the memory block is performed first, and a defragmentation operation on the other half of the memory block is performed when a controller (i.e. a micro-processor) is not so busy. In this way, the controller can arrange the tasks more flexibly and the performance of the system can be further improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storing method for storing data into a storage apparatus, the storage apparatus having a plurality of memory blocks, each memory block comprising a first terminal and a second terminal; the data storing method comprising:

receiving a data set;

selecting a first writing direction or a second writing direction to be a preferred writing direction, the first writing direction being opposite to the second writing direction, wherein when the first writing direction is selected to be the preferred writing direction, the first terminal is a starting point corresponding to the first writing direction, and when the second writing direction is selected to be the preferred writing direction, the second terminal is a staffing point corresponding to the second writing direction;

writing the data set into one or more memory blocks according to the selected writing direction;

computing a remaining space of each of the memory blocks;

selecting a memory block from the plurality of memory blocks, wherein the remaining space of the selected memory block is greater than the size of the data set; and computing a fragmentation level of each of the memory blocks to select a target-defragment memory block and to perform a defragmentation operation on the target-defragment memory block.

2. The data storing method of claim 1, wherein the step of performing the defragmentation operation further comprises:
performing the defragmentation operation on the data sets written into the target-defragment memory block according to the first writing direction or on the data sets written into the target-defragment memory block according to the second writing direction.

3. The data storing method of claim 2, wherein the step of performing the defragmentation operation further comprises:
computing fragmentation levels of the data sets written into the target-defragment memory block according to the first and second writing directions respectively, and selectively performing the defragmentation operation according to the writing direction which corresponds to a greater fragmentation level of the data sets.

4. The data storing method of claim 1, wherein when the remaining spaces of the memory blocks are all smaller than the size of the data set, the defragmentation operation is performed.

5. The data storing method of claim 1, wherein the defragmentation operation is selectively executed in the beginning and the end of a program.

6. The data storing method of claim 1, wherein the step of selecting the target-defragment memory block further comprises:
selecting a memory block with a greatest fragmentation level from the memory blocks to be the target-defragment memory block.

7. The data storing method of claim 1, wherein the step of selecting the target-defragment memory block further comprises:
selecting a memory block with a fragmentation level greater than a threshold value from the memory blocks to be the target-defragment memory block.

8. An electronic device, comprising:
a memory block comprising a first terminal and a second terminal;
a computer-readable medium for storing a program, wherein when executing the program, a data set is generated and the program writes the data set into the memory block in a first writing direction staffing from the first terminal or in a second writing direction starting from the second terminal, wherein the first writing direction is opposite to the second writing direction, wherein when the program selects the first writing direction to be the preferred writing direction, the first terminal is a staffing point corresponding to the first writing direction; and when the program selects the second writing direction to be the preferred writing direction, the second terminal is a starting point corresponding to the second writing direction, wherein the program computes a fragmentation level of each of the memory blocks to select a target-defragment memory block and perform a defragmentation operation on the target-defragment memory block, wherein the target-defragment memory block contains the data sets written according to either the first writing direction or the second writing direction; and a processor for executing the program stored in the computer-readable medium.

9. The electronic device of claim 8, wherein the target-defragment memory block contains the data sets written according to the first or the second writing direction corresponding to the greater fragmentation level.

10. The electronic device of claim 8, wherein if the remaining space of the memory block is smaller than the size of the data set, the defragmentation operation is performed.

11. The electronic device of claim 8, wherein the defragmentation operation can be executed in the beginning or the end of a program.

12. The electronic device of claim 8, wherein when the fragmentation level is greater than a threshold value, the defragmentation operation is performed.

13. A data storing method for storing data into a storage apparatus, the storage apparatus having a memory block, the memory block comprising a first terminal and a second terminal; the data storing method comprising:
  receiving a data set;
  selecting a first writing direction or a second writing direction to be a preferred writing direction, comprising:
    comparing a first total amount with a second total amount, wherein the first total amount is a data amount of data sets written into the memory block according to the first writing direction, and the second total amount is a data amount of data sets written into the memory block according to the second writing direction;
    selecting the first writing direction to be the preferred writing direction if the first total amount is less than the second total amount; and
    selecting the second writing direction to be the preferred writing direction if the first total amount is greater than the second total amount;
  wherein the first writing direction is opposite to the second writing direction, when the first writing direction is selected to be the preferred writing direction, the first terminal is a starting point corresponding to the first writing direction, and when the second writing direction is selected to be the preferred writing direction, the second terminal is a starting point corresponding to the second writing direction; and
  writing the data set into the memory block according to the selected writing direction.

14. An electronic device, comprising:
a memory block comprising a first terminal and a second terminal;
a computer-readable medium for storing a program, wherein when executing the program, a data set is generated and the program writes the data set into the memory block in a first writing direction staffing from the first terminal or in a second writing direction starting from the second terminal, wherein the first writing direction is opposite to the second writing direction, wherein when the program selects the first writing direction to be the preferred writing direction, the first terminal is a staffing point corresponding to the first writing direction; and when the program selects the second writing direction to be the preferred writing direction, the second terminal is a staffing point corresponding to the second writing direction, wherein the program compares a first total amount with a second total amount, wherein the first total amount is a data amount of data sets written into the memory block according to the first writing direction, and the second total amount is a data amount of data sets written into the memory block according to the second writing direction, and the program selects the first writing direction to be the preferred writing direction if the first total amount is less than the second total amount, or selects the second writing direction to be the preferred writing direction if the first total amount is greater than the second total amount; and
a processor for executing the program stored in the computer-readable medium.

* * * * *